B. A. LEGG.

Assignor by mesne assignments, to HIMSELF AND W. D. PARK.

DRIVE CHAIN.

No. 10,904. Reissued Feb. 21, 1888.

Witnesses.

H. Burke

J. S. Barker.

Inventor.

Benjamin A. Legg.

by Doubleday & Bliss Attys.

UNITED STATES PATENT OFFICE

BENJAMIN A. LEGG, OF COLUMBUS, OHIO, ASSIGNOR, BY MESNE ASSIGNMENTS, TO HIMSELF AND WILLIAM D. PARK, OF SAME PLACE.

DRIVE-CHAIN.

SPECIFICATION forming part of Reissued Letters Patent No. 10,904, dated February 21, 1888.

Original No. 282,536, dated August 7, 1883. Application for reissue filed June 24, 1884. Serial No. 138,807.

*To all whom it may concern:*

Be it known that I, BENJAMIN A. LEGG, a citizen of the United States, residing at Columbus, in the county of Franklin and State of Ohio, have invented certain new and useful Improvements in Chains; and I do hereby declare that the following is a full, clear, and exact description of the invention, that will enable others skilled in the art to which it appertains to make and use the same, reference being had to the accompanying drawings, and to letters of reference marked thereon, which form a part of this specification.

Figure 1:
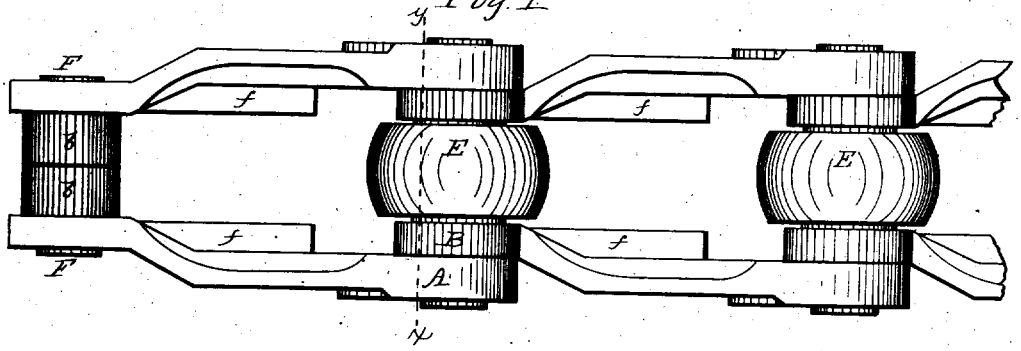
Figure 2:
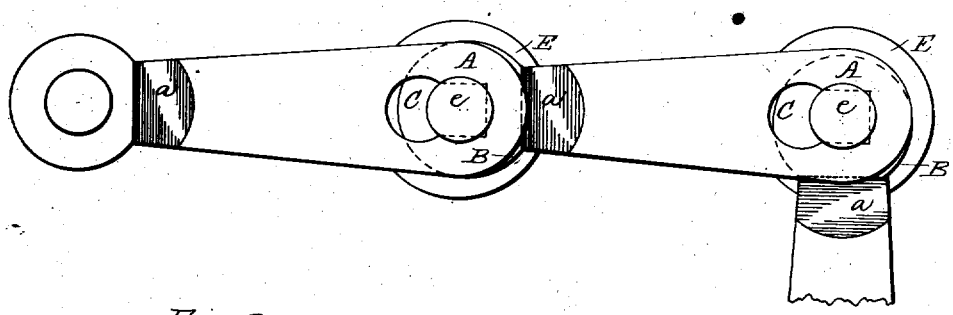
Figure 3:
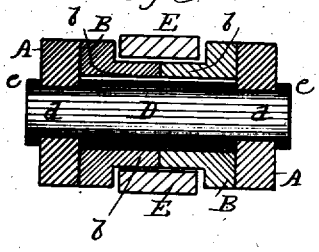
Figure 4:
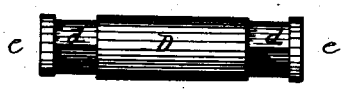
Figure 5:
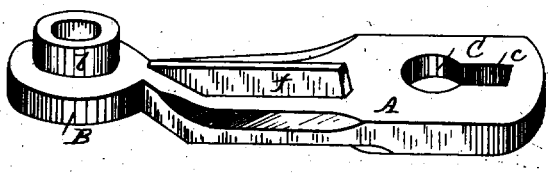

Figure 1 is a plan view of my improved chain. Fig. 2 is a side view, two of the links being in position to be detached. Fig. 3 is a transverse section on line *x y*, Fig. 1. Fig. 4 is a detached view of the connecting spindle or pin. Fig. 5 is a detached view in perspective of one of the side bars.

The invention has for its object the construction of a detachable driving-chain in such manner that the parts may be readily connected with each other and disconnected when placed in certain arbitrarily-selected positions.

In the drawings, A *a* B represent one of the side bars, the part *a* constituting an angular shank, which connects the parts A B with each other, and may occupy an inclined position relative to the parts A B, as shown; or the bar may be constructed with a right-angled shoulder at this point, either construction subserving a purpose which will soon be explained. The part A is provided with a key-hole-shaped opening, C, and the part B is provided with a lateral tubular projection, *b*.

*f* is a web upon the inner face of the side bar.

D *d d e e* is a spindle or pin, the central portion, D, of which is round in cross-section, the ends *d d* being squared in cross-section; or, when preferred, they may be made with three flat sides, two of which are at right angles to the third, the fourth side being circular, and by preference of the same curve as the part D.

*e e* are circular flanges upon the outer ends of the parts *d d*, and preferably of the same diameter as the central part, D.

E E is an anti-friction roller.

By an examination of the drawings it will be readily understood that the chain may be put together in the following manner: Place the inner ends of two of the tubular parts *b b* in contact with each other and thrust the spindle D through them. Then slip the circular part C of the key-hole-shaped opening over the flanged end *e* of the spindle, the bar thus added being held at a right angle to the other pair of bars. Next move this newly-added bar longitudinally until the squared part *d* is drawn into the angular portion *c* of the key-hole-shaped opening. Another side bar is then applied in like manner to the opposite end of the spindle, after which this newly-added pair of side bars may be swung into line with the first-named pair, the operation being continued until a chain of the desired length is formed.

Upon an inspection of Fig. 1 it will be readily understood that while the links are in substantially the position there shown the engagement of the parts *a a* with the opposing ends of the parts A A retain the squared ends *d d* of the spindles in the angular portions *c c* of the key-hole-shaped openings, and hence the ends A A cannot spread apart or slip off from the parts *d d* by reason of the flanges *e e*.

When it is desired to use anti-friction rollers E E, they must be placed upon the tubular extensions *b b* before the spindles are thrust through said parts *b b*.

The webs *f f* serve not only to strengthen the side bars, but also to form guides adapted to engage with opposite sides of the sprocket-wheel spurs, and thus insure that the chain shall run steadily and that the anti-friction rollers or the tubular extension *b b* shall properly engage with the working-faces of the teeth.

I do not wish to be limited to forming a tubular projection, *b*, upon the inner faces of both of the side bars, which are placed next to the part D of the spindle, because the tubular extension upon one side bar of the pair might be made as long as the anti-friction roller is wide, the other side bar of the pair being provided with a round hole or seat corresponding in diameter to the portion of the spindle.

By making the side bars separable, as above indicated, whether the tubular portion be formed in two parts or be formed wholly in the same piece with one of the side bars, I secure some very important advantages. Again, I am enabled to mount an anti-friction roller upon the tubular extensions or sleeves between each pair of side bars throughout the entire length of the chain.

Another difference in operation between my chain and any preceding one of which I have knowledge is this: My pintle, in addition to forming a pivotal connection between two adjacent lengths and being so connected at its ends to the side bars by means of the key-hole-shaped slots and the squared ends of the pintle that it (the pintle) vibrates or oscillates within the tubular extensions, also serves to hold the side bars, the tubular extensions, and the anti-friction roller (when such roller is used) in proper working relation, preventing the side bars themselves from spreading, it being apparent that were it not for the projecting flanges, or an equivalent therefor, at the ends of the pintle it would be possible in ordinary use for the separable side bars and the tubular extensions to spread apart to such an extent that the entire chain would fall asunder. It is also apparent that the tubular extensions, in addition to increasing the wearing-surface which engages with the pintle, also serve as spacing-thimbles to properly regulate or determine the distance between the side bars, and it is apparent that this function of spacing will be performed substantially in the same manner whether the tubular extensions be divided centrally, so that a portion of it is attached to each side bar of the pair, or is made in one piece only of a length substantially equal to the distance between the side bars.

What I claim is—

1. In a drive-chain, the combination of a series of links having separable side bars provided at their ends with pintle-seats, a series of pintles mounted at their ends in the side bars, and a series of tubular extensions rigidly connected with the side bars and projecting inward from the side bars and mounted on the pintles, substantially as set forth.

2. In a drive-chain, the combination of a series of links having separable side bars, and provided at their ends with pintle-seats, a series of pintles mounted at their ends in the side bars, a series of tubular extensions rigidly connected with the side bars and projecting inward from the side bars and mounted on the pintles, and anti-friction rollers mounted upon tubular extensions, substantially as set forth.

3. In a drive-chain, the combination of links, each having separable side bars provided at one end with tubular extensions and at their opposite end with a pintle-seat, and a series of pintles mounted loosely in the tubular extensions and locked to the ends of adjacent links, so as to be incapable of rotation relative thereto, and operating to prevent the side bars from lateral displacement, substantially as set forth.

4. In a drive-chain, the combination of the separable parallel side bars, each having a key-hole-shaped opening in one end and a separable tubular bearing for the pintle at the other end, and the pintle provided with flat sides at its ends to enter the portions *c c* of the key-hole-shaped openings, the flanges and the round portion adapted to fit the tubular bearings, substantially as set forth.

5. In a drive-chain, the combination of the separable parallel side bars, each having a key-hole-shaped opening in one end and a separable tubular bearing for the pintle in the other end, and the pintle provided at its ends with lateral projections, said pintle being seated in the tubular end bars and the key-hole-shaped openings, and operating to retain the tubular bearing and the separable side bars in proper working relation, substantially as set forth.

6. In a drive-chain, the combination of the separable side bars, each having a key-hole-shaped opening in one end and a separable tubular bearing in the other end, with the anti-friction roller, and the pintle provided at its ends with lateral projections and operating as a pivotal connection for the links, and also to retain the tubular bearing, the separable side bars, and the anti-friction roller in proper working relation, substantially as set forth.

In testimony whereof I affix my signature in presence of two witnesses.

BENJAMIN A. LEGG.

Witnesses:

CHARLES W. MILLER,

J. L. MCCOY.